(12) United States Patent
Erden et al.

(10) Patent No.: US 10,963,188 B1
(45) Date of Patent: Mar. 30, 2021

(54) SENSOR PROCESSING SYSTEM UTILIZING DOMAIN TRANSFORM TO PROCESS REDUCED-SIZE SUBSTREAMS

(71) Applicant: Seagate Technology LLC, Cupertino, CA (US)

(72) Inventors: Mehmet Fatih Erden, St. Louis Park, MN (US); Manuel Alexander Offenberg, South Lake Tahoe, CA (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 16/454,354

(22) Filed: Jun. 27, 2019

(51) Int. Cl.
| | |
|---|---|
| *G06F 3/06* | (2006.01) |
| *G06N 3/08* | (2006.01) |
| *G06K 9/00* | (2006.01) |
| *G06K 9/62* | (2006.01) |
| *G06F 13/16* | (2006.01) |

(52) U.S. Cl.
CPC .......... *G06F 3/0659* (2013.01); *G06F 3/0611* (2013.01); *G06F 3/0673* (2013.01); *G06F 13/1668* (2013.01); *G06K 9/00228* (2013.01); *G06K 9/00362* (2013.01); *G06K 9/00711* (2013.01); *G06K 9/6262* (2013.01); *G06N 3/08* (2013.01)

(58) Field of Classification Search
CPC .... G06F 3/0659; G06F 3/0611; G06F 3/0673; G06F 13/1668; G06N 3/08; G06K 9/00711; G06K 9/6262; G06K 9/00362
USPC ....................................................... 711/154
See application file for complete search history.

(56) References Cited

U.S. PATENT DOCUMENTS

| | | | |
|---|---|---|---|
| 8,224,931 B1 | 7/2012 | Brandwine et al. | |
| 9,087,098 B2 | 7/2015 | Lin et al. | |
| 2004/0034864 A1* | 2/2004 | Barrett | H04N 21/8453 |
| | | | 725/38 |
| 2012/0026898 A1 | 2/2012 | Sen et al. | |
| 2012/0197856 A1 | 8/2012 | Banka et al. | |
| 2013/0318025 A1 | 11/2013 | Alemzadeh et al. | |
| 2018/0157915 A1* | 6/2018 | Sherry | G06K 9/00228 |
| 2020/0228840 A1* | 7/2020 | Fracastoro | G06K 9/6892 |

\* cited by examiner

*Primary Examiner* — Hashem Farrokh
(74) *Attorney, Agent, or Firm* — Mueting Raasch Group

(57) ABSTRACT

A digital sensor stream is received from a sensor. A domain transform is performed on the digital sensor stream to produce first and second substreams. The first substream is larger than the second substream. The first substream is stored in cold storage and the second substream is stored in a second storage that has faster access times than the cold storage. Deep machine learning is performed on the second substream, the results of which may be stored in the second storage.

20 Claims, 6 Drawing Sheets

SENSOR PROCESSING SYSTEM UTILIZING DOMAIN TRANSFORM TO PROCESS REDUCED-SIZE SUBSTREAMS

SUMMARY

The present disclosure is directed to a sensor processing system utilizing domain transform to process reduced-size substreams. In one embodiment, a digital sensor stream is received from a sensor. A domain transform is performed on the digital sensor stream to produce first and second substreams. The first substream is larger than the 10 second substream. The first substream is stored in cold storage and the second substream is stored in a second storage that has faster access times than the cold storage. Deep machine learning is performed on the second substream, the results of which are stored in the second storage.

In another embodiment, a system includes one or more input/output busses configured to receive a digital sensor stream from a sensor. A cold storage unit is coupled to the input/output busses. A processor is coupled to the input/output busses and configured to perform system management. Two or more storage compute devices are coupled to the input/output busses and configured to perform a domain transform on the digital sensor stream to produce first and second substreams. The first substream is larger than the second substream. The storage compute devices store the first substream in the mass storage unit and store the second substream in a second storage that has faster access times than the cold storage. The storage compute devices perform deep machine learning on the second substream.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to distributed data storage and computation systems. Conventionally, client computing devices (e.g., personal computing devices) use local data storage and computation working on the signals either being collected or already collected by various sensors. In case of extra storage space needed, data is sent to a mass storage unit where overall storage system at the cloud is optimized in terms of capacity, power, and performance. Use of mass storage unit is a cost effective solution to store large amounts of data. However, modern computation systems may perform computations on this sensor data, and it can be expensive to perform the computation directly on the stored data. This is true whether such data is stored first and later recalled for analysis or computed on its way to storage, e.g., on the data streams analyzed real-time.

Figure 1:
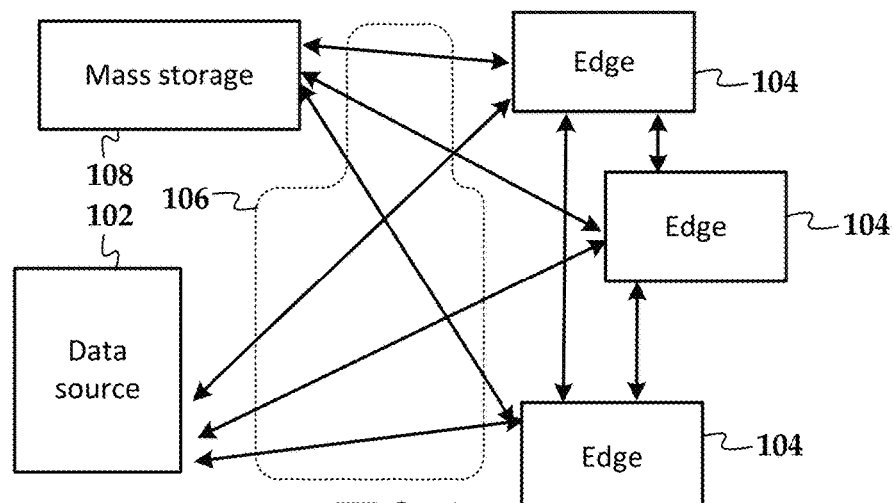
FIG. 1 is a block diagram of a network of edges according to an example embodiment.

In order to address these issues, new data storage system tiers, called "edges" are introduced. An example of a system using edge nodes according to an example embodiment is shown in the diagram of FIG. 1. The system uses one or more data sources 102 that may be fixed or mobile data processing devices such as desktop computers, laptop computers, mobile phones, tablets, wearable computing devices, sensor devices, external storage devices, etc. The data sources 102 are coupled to edge nodes 104 via one or more links 106 such as an input-output bus, network, etc. The edge nodes 104 may be visualized as application-specific storage nodes local to the application, with their own sensors, compute blocks, and storage.

Eventually, some or all the data generated by the data sources 102 and edge nodes 104 might be stored in mass storage 108, which generally refers to one or more local or remote-located storage arrays. The mass storage 108 may also be able to be used for computation services that are offered together with the storage, as well as features such as security, data backup, etc. However, bandwidth-heavy computation and associated data flows can be done more efficiently within the edges 104 themselves. There can also be peer-to-peer data flow among edges 104. Because of the benefits offered by "edge" architectures, edge focused applications are increasing, and started to cover wide variety of applications.

Figure 2:
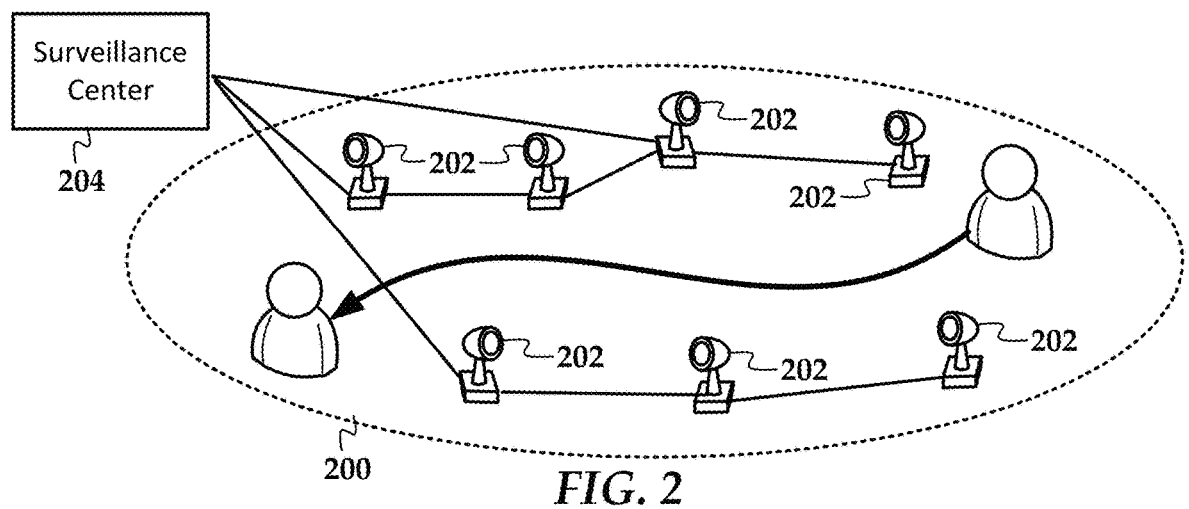
FIG. 2 is a block diagram of an edge application according to an example embodiment.

One specific case of an edge architecture is shown in the block diagram of FIG. 2, which illustrates a video recording system according to an example embodiment. This system may be used, for example, as surveillance system for a university campus. The purpose of such a system is to observe every location of the targeted premise 200 (the university campus in this example) at any time via a network of cameras 202. The cameras 202, together with a surveillance center 204, record all the data, compute to detect abnormalities or other features detected in the data, and report in a timely manner. The cameras 202 and/or elements within the surveillance center 204 may be configured as edge nodes, and therefore perform some level of computation and storage of the video data on their own.

Figure 3:
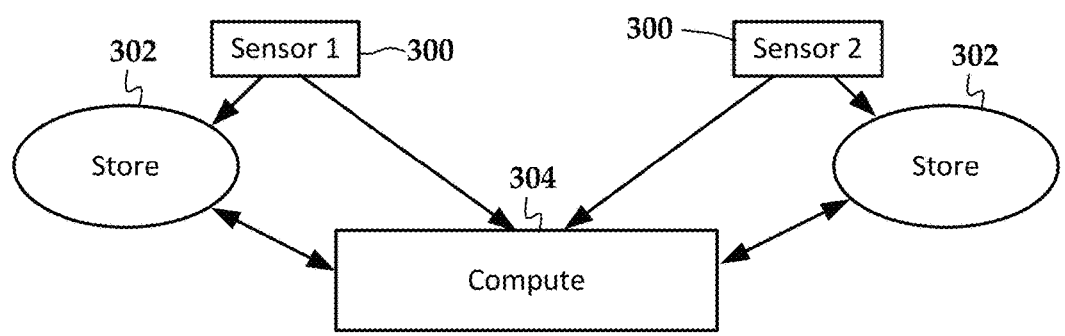
FIG. 3 is a block diagram of a compute and storage function according to example embodiments.

In order to meet the purpose of the whole system, the edge applications have "store" units used for data storage and "compute" block to execute the necessary computations for a given objective. For illustrative purposes, a block diagram in FIG. 3 shows two sensors 300 (e.g., cameras 202 as in FIG. 2) connected to two storage blocks 302 and a compute block 304 according to an example embodiment. Those store blocks 302 can be attached to sensors 202 in FIG. 2, or they can be located in the surveillance center 204 along with the compute block 304.

The architecture shown in FIG. 3 may have significant data storage requirements, e.g., when raw sensor data is being stored. Different types of connections (e.g., sensor to store, sensor to compute, store to compute, compute to store) exist with different requirements. For those connections used to transfer raw sensor data, significant bandwidth may be required. The compute block 304 works with huge amount of raw sensor data to process those to extract the relevant information from the collection of signals. It might include deep-machine-learning type processors, and thus require complex coding and consume significant power to process the raw signals. The store blocks 302 likely hold sensitive data or data that has to be trusted. This data should be protected when consumed by the compute blocks, when stored awaiting processing, and when moved between different nodes. An ever-growing number of edge nodes in distributed systems increases the risk to data security.

Figure 4:
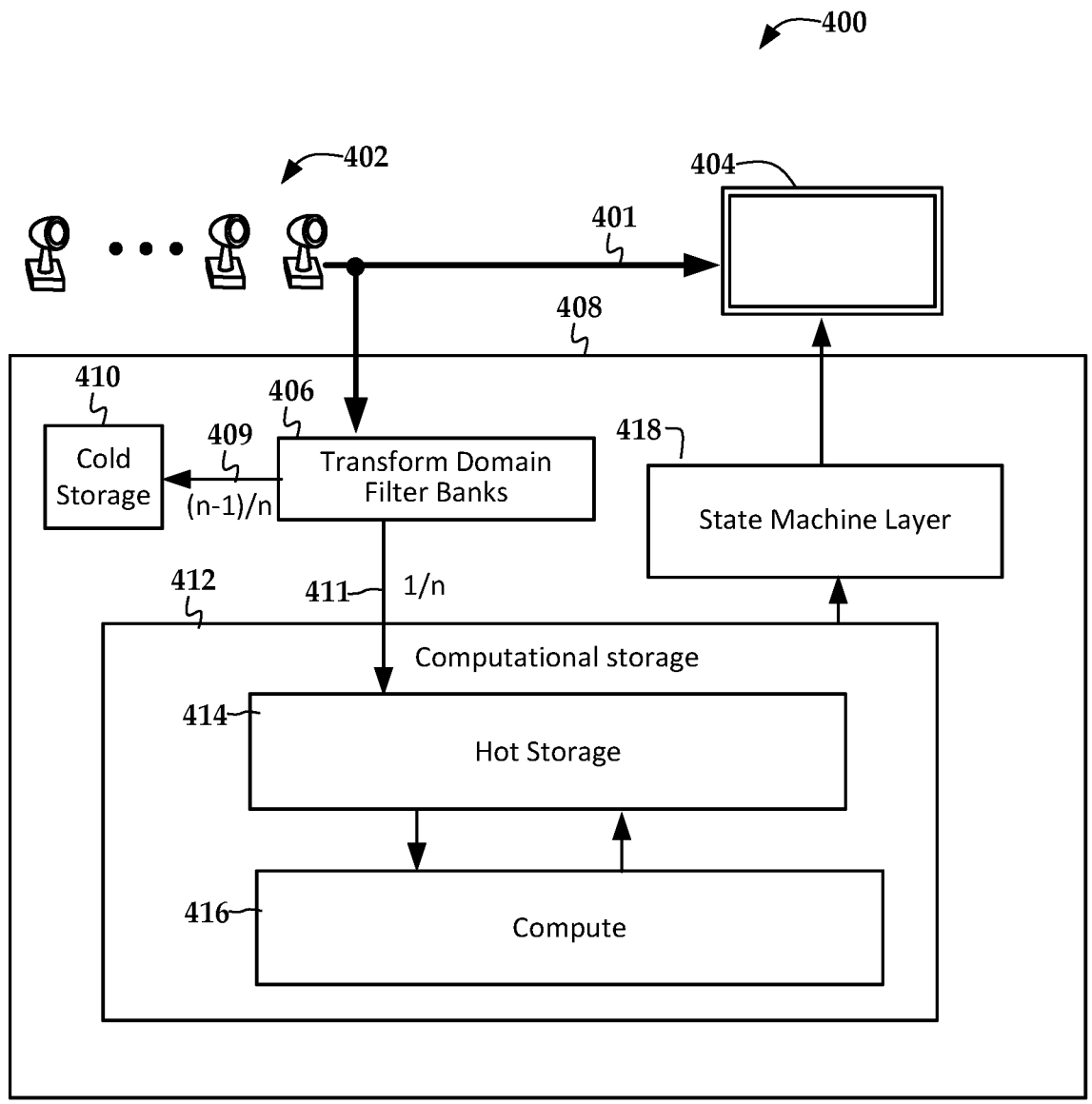
FIG. 4 is a block diagram of a sensor network according to an example embodiment.

In FIG. 4, a diagram shows a specific implementation of a sensor processing system 400 according to an example embodiment. This example is also directed to a video surveillance system, but may be used for any type of application where large amounts of data are streamed, analyzed, and stored. In this case, a plurality of data streams 401 originates from an array of cameras 402. The data streams 401 may be fed into a display system 404 for live viewing. The display system 404 may include multiple local and/or remote displays, as well as a user interface for facilitating user control as described below.

Generally, the data streams 401 include digitized video and metadata (e.g., time stamps, device identifiers, etc.). The data streams 401 are also fed into transform domain filter banks 406 of a video processing system 408. The transform domain filter banks 406 decompose the data streams 401 into n-fractional components, indicated here as first substream 409 and second substream 411. For example, if n=8, then the data streams 401 may be separated into two substreams respectively having ⅛ and ⅞ the number of samples of the full stream. In another example, the streams could be decomposed into three substreams having respectively ⅛, ⅜, and ½ the number of samples of the full stream. In some cases, the fractional components need not add up to one. For example, first substream 409 may include all of the data of the video streams 401, while substream 411 includes a 1/n sized stream.

For video streams, the transform domain filter banks 406 may use discrete wavelet transform (DWT) to decompose the video into reduced-size streams. This use of DWT for transforming data streams for machine-learning processes is described in commonly-owned U.S. patent application Ser. No. 16/189,018 filed on Nov. 13, 2018, which is hereby incorporated by reference in its entirety. For other types of data, other transforms could be used. For example, a discrete Fourier transform may be used to break a signal into m*n-frequency components, with the ratios such as m(n−1)/n being used as the first substream 409 and m/n being used as the second substream 411.

In this particular example which shows a video signal 401, the first substream 409 includes (n−1)/n of the samples that are sent to a cold storage unit 410 (n>2) and the smaller, 1/n fractional second substream 411 is sent to a computational storage unit 412. The cold storage unit 410 is generally an array of data storage devices that is optimized for cost, typically at the expense of fast or easy random access to the data. This type of storage is sometimes referred to as archival storage, in which data is expected to be mainly written and read back sequentially. Examples of media that may be used in the mass storage unit 410 include tape and certain types of hard disk drives (HDDs) such as shingled magnetic recording (SMR). In both cases, the media allows for relatively fast, sequential writes and reads, but random or partial updates to the media are more time consuming, as are random reads. Generally, the data in the mass storage unit 410 is kept for legal or security reasons and retained for a specified period of time (e.g., 30-90 days). After this time, data that has aged past this period may be overwritten by new data.

The computational storage unit 412 may be configured as one or more edge nodes that perform image processing tasks, e.g., detection of static and dynamic features in the video streams via one or more compute layers 416. The image processing unit includes one or more hot store units 414 that store the smaller substream 411, before and/or after processing, as well as any features extracted from the data. The hot store units 414 are generally faster and more expensive per unit of storage, but have much better random access performance. Examples of media used for the storage units 414 include multi-actuator HDDs and solid-state drives (SSD).

The compute layer 416 includes functional modules that are configured to perform various analysis and recognition functions, such as detecting faces, bodies, etc., without performing a specific recognition, e.g., determining an identity based on the feature. As such, these functional modules can use relatively fewer computational resources compared ones which may provide more specific identification. For example, if deep-learning neural networks are used, a smaller network (e.g., fewer hidden layers) can be used to identify faces generally, as opposed to matching a specific identity to a detected face.

Note that the arrows between the compute sections 416 and storage units 414 indicate relatively high levels of data transfer therebetween. Such data transfer may also involve random access, e.g., writing analysis results as data or metadata into a database. Because both units 414, 416 are operating on a reduced size data substream 411, the respective storage capacity and computing capacity of the units 414, 416 can be significantly reduced compared to if they had to operate on the full data streams 401. If at some point any of the full data streams 401 need to be reconstituted (e.g., for human analysis, higher-resolution machine learning), this can be done by accessing both substreams 409, 411 from mass storage 410 and storage units 414.

Neural networks are commonly implemented on graphics processing units (GPUs) or tensor processing units (TCUs) due to the ability of these processing units to perform massively parallel computations. However, these processing units can be expensive, both in terms of hardware costs, as well as operational costs (e.g., power consumption, dissipation of heat). The lower computational requirements of the compute sections 416 allows them to be implemented on less expensive GPUs or central processing unit (CPU) cores. For example, small, power-efficient CPUs and GPUs used in mobile devices may include multiple processing cores capable of handling part or all of the tasks of the compute sections 416.

In some embodiments, the role of the compute sections 416 and storage units 414 can be performed by a storage compute device. Generally, this is a device with a standard data storage device form factor (e.g., 3.5 inch drive, 2.5 inch drive) as well as standard data storage device interfaces (e.g., SATA or SAS interfaces). As such, the storage compute device may be installed and operate the same as a conventional HDD or SSD. However, the storage compute device will have extended firmware that allows it to perform additional functions besides the load, store and verify operations often associated with storage drive command sets. It can also be modified for upcoming interfaces, such as NVME.

Such storage compute devices may have much larger processing sections and random access memory (RAM) than is needed for just storing and retrieving data. The storage compute may also have a command parser that allows passing computational commands to the drive via existing command sets, or extensions thereof. As such, the storage compute device may behave more like a general-purpose computer, albeit with a minimal set of input/output (I/O) that allows it to perform a targeted set of function, such as implementing a standalone or distributed neural network within a sensor processing system.

In the arrangement of FIG. 4, an array of storage compute device can be used to provide both the function of the compute sections 416 and storage units 414. Each storage compute device may be rated for a particular storage capacity and processing engine. Presuming that storage requirements scale approximate to computation capacity, multiple storage compute devices could pool their storage resources as well as compute resources to fulfill the requirements of the storage units 414.

Also seen in FIG. 4 is a state machine layer 418 that facilitates management of the system 400 and may run on its own dedicated processor. The state machine layer 418 may facilitate turning on particular functionality, such as face and body detection. The state machine layer 418 may also facilitate sending the results of the machine learning algorithms to the display system 404, such as particular identified features, statistics (e.g., number of faces detected per hour), movement in predetermined areas of interest, etc. It is expected that the state machine layer 418 would be integrated with at least the functions of the compute sections 416 such that the system could be easily adapted for other purposes. For example, by changing the neural network or other machine learning structures to instead recognize vehicles, license plates, road features, etc., the system could be adapted for use in a traffic management system instead of human recognition, yet still use substantially the same hardware.

Figure 5:
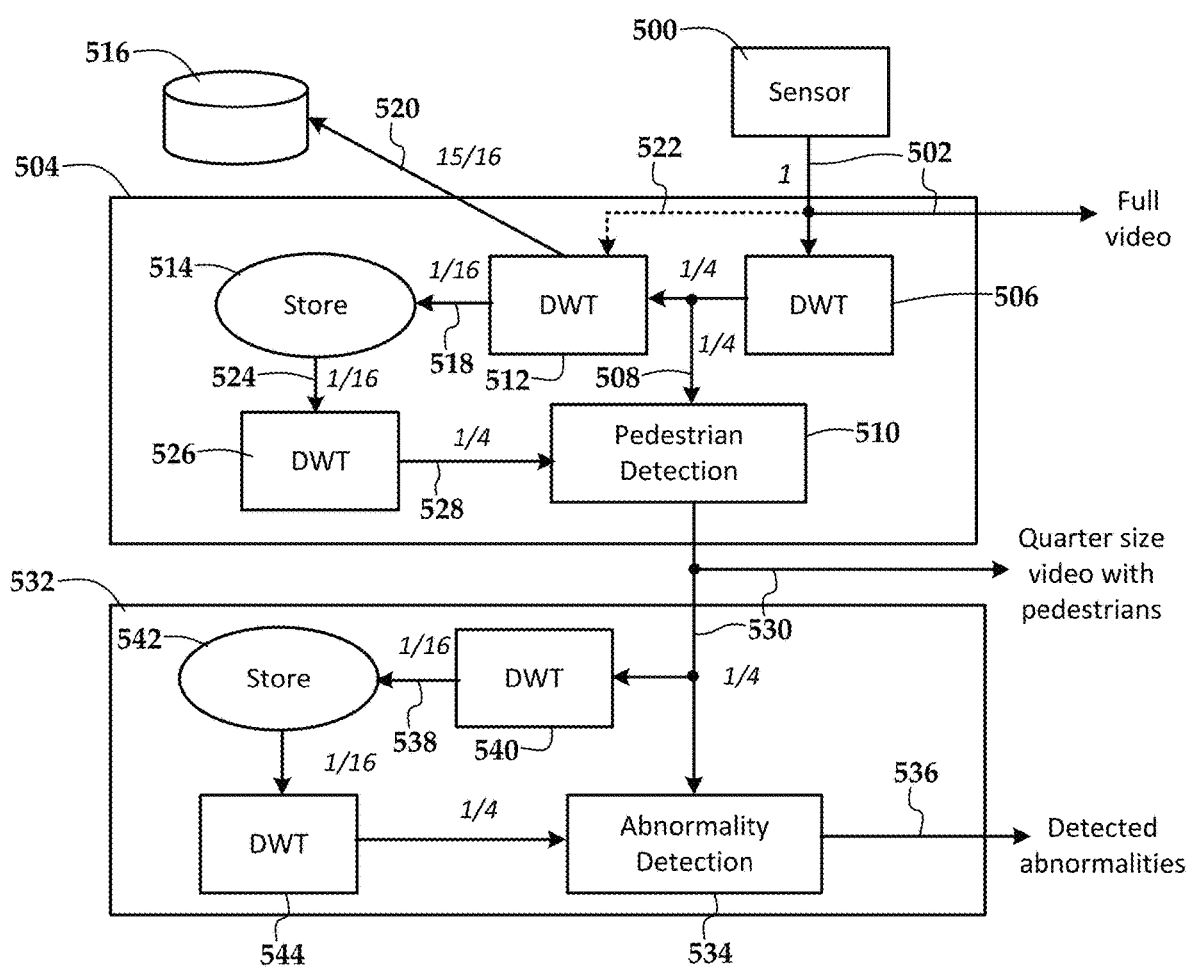
FIG. 5 is a block diagram showing a video processing arrangement according to example embodiments.

In FIG. 5, a block diagram illustrates a particular example embodiment of a video processing system. As with the previous example, the system processes sensor inputs from a sensor 500, which may be part of an array of similar or different sensors whose outputs are similarly processed by the system. The full output 502 of the sensor 500 (indicated by the numeral '1' in italics) may be output to a live monitor, such as a video display. The full output 502 also goes to a DWT processor 506 that is part of a first processing tier 504. The DWT processor 506 decomposes the full signal 502 into a ¼ size stream 508 that is fed into a pedestrian detection module 510 that detects pedestrians in the video stream.

A second DWT processor 512 also takes the ¼ size stream 508 and extracts a 1/16 size stream 518 that is placed into a local store unit 514. The DWT block 512 also reconstitutes a 15/16 size stream 520 that is placed into mass storage 516. Note that the recreated stream 520 may be missing some information depending on what information was left out of the reduced stream 518. As indicated by dashed line 522, the DWT processor 512 may instead create these streams 518, 520 directly from the original full stream 502. Also note that a 1/16 sized stream 524 can be read from the data store 514, expanded to a ¼ size stream 528, and be fed into the pedestrian detection module 510. This may occur when there are multiple sensors, and some of the sensor data is buffered in the data store 514 for later processing.

The output of the pedestrian detection module 510 is a ¼ size video stream 530 that can be output, e.g., to a display, as well as being input into a second processing tier 532. In particular, the video stream 530 is fed into an abnormality detection module 534 that extracts abnormalities in pedestrian video segments. The output is a stream 536 (e.g., video, metadata) that indicates detected abnormalities. In this tier 532, the incoming pedestrian video stream 530 is reduced to a 1/16 stream 538 by a DWT module 540, the stream 538 being stored in data store 542. The stored stream data may also be expanded via DWT module 544 for delayed processing via abnormality detection module 534.

Figure 6:
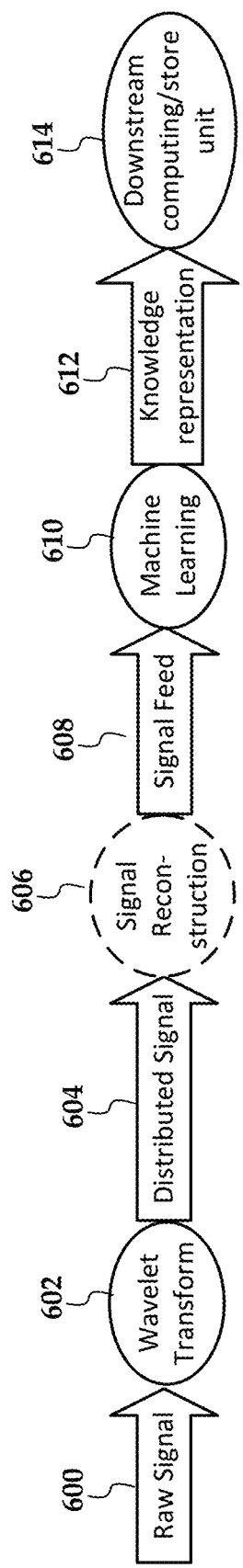
FIG. 6 is a block diagram showing signals and transforms in systems according to example embodiments.

In FIG. 6, a diagram illustrates a generalized processing stream that may be used as a template for building a processing system according to various example embodiments. The sequence begins with raw sensor signal 600, which may generally be a streaming signal produced from a sensing device (e.g., video detector, microphone, infrared imager, etc.), and typically digitized either before or after being fed into the system. While the signal 600 is labeled as "raw," there may still be some processing applied to it, such as compression, addition of metadata, etc. For example, a video signal may be compressed and formatted using H.264 or other schemes, as well as having other data added such as sensor device identifier, location information, encryption, etc.

A wavelet transform module 602 uses a process such as DWT to transform the raw signal into one or more distributed signals 604. Generally the distributed signals 604 are reduced in size (e.g., resolution) compared to the raw signal 600, although an inverse of the transform may be used to recreate a facsimile of the larger sized, higher resolution signal. This is shown by signals reconstruction module 606, which is drawn in dashed lines indicating it is optional. The output of the signal reconstruction module 608 may be a reconstructed signal feed 608, or the feed 608 may be one of the distributed signals 604 in cases where module 606 is not used.

The signal feed 608 is processed by a machine learning module 610 which extracts a knowledge representation 612. The knowledge representation 612 may be in a similar format as the signal feed 608. For example, both 608 and 612 may be video feeds, but the knowledge representation 612 may only include a fraction of the original video, e.g., only highlighting the areas of interest. The knowledge representation 612 may be different than the signal feed 608. In the previous example, instead of preparing the knowledge representation 612 as video, it may be an array of Cartesian coordinates associated with individual video frames that identify the areas of interest. This may be overlaid over the original video feed in subsequent processing. The knowledge representation 612 may be used in downstream modules 614, e.g., storage, additional computation. The implementations shown herein, e.g., in FIGS. 4 and 5, may use multiple processing streams as shown in FIG. 6 distributed among multiple processing units (e.g., storage compute devices).

Figure 7:
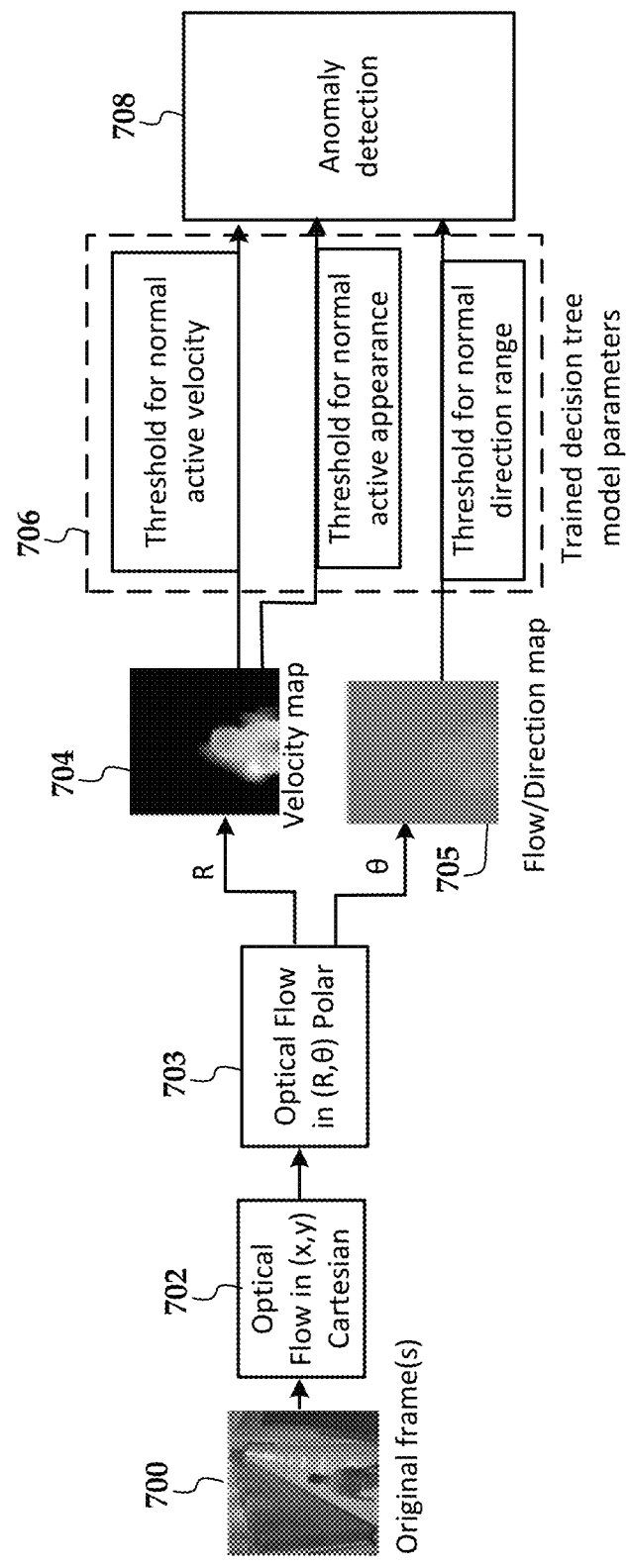
FIG. 7 is a block diagram showing the determination of anomalies in video streams according to an example embodiment.

Note that in addition to extracting particular features (e.g., faces, bodies, cars, etc.) the system may also identify anomalies, which are generally predefined characteristics that can be quantified and that exceed a threshold. For example, a detected object that is moving faster than a specified speed may be considered an anomaly that the system administrator wants to be automatically detected. In FIG. 7, a diagram shows an example of processing video to determine anomalies according to an example embodiment. A video frame 700 (or sequence thereof) is analyzed by processing block 702 to determine optical flow in a Cartesian coordinate system, a block 703 converts this to a polar coordinate systems. The respective radius and angle data (R,θ) are used to form respective velocity may 704 and flow/direction map 705. These maps 704 are processed by a trained decision tree model(s) 706. The model 706 has various threshold detectors that detect various anomalies that are captured via an anomaly detection module 708 that may store the detected anomalies and/or send them onto other processing streams for further analysis.

Figure 8:
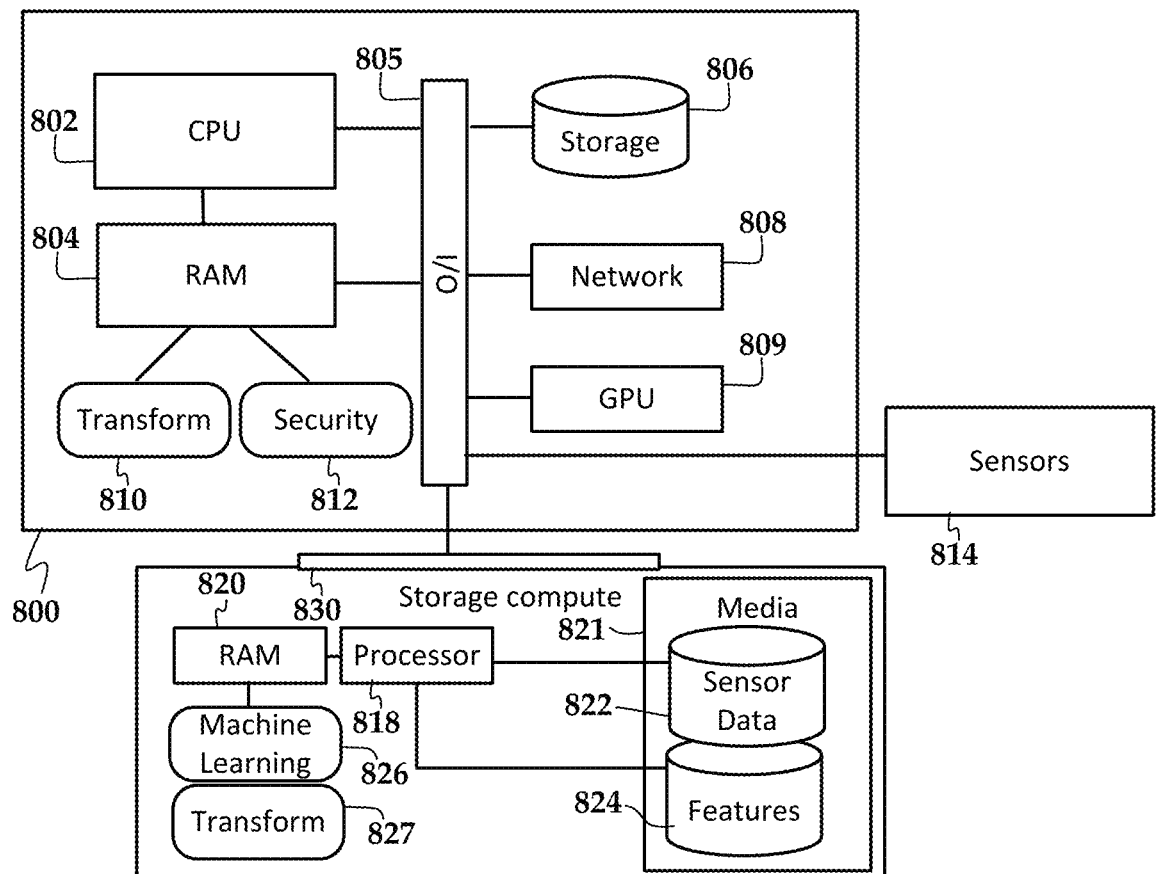
FIG. 8 is a block diagram of an apparatus according to an example embodiment.

In the embodiments described above, the video processing system may use conventional computer hardware, as well as hardware that is adapted for the particular functions performed within the respective processing sections. In FIG. 8, a block diagram shows components of an apparatus 800 that may be used as part of a video processing system as described herein. The apparatus 800 includes one or more central processing units (CPUs) 802 and volatile memory 804, e.g., random access memory (RAM). The CPU 802 is coupled to one or more input/output (I/O) busses 805, and RAM 804 may also be accessible by devices coupled to the bus 805, e.g., via direct memory access. Other devices such as network interface card 808 and GPU 809 may also be coupled to the I/O bus 805. A persistent data storage 806 (e.g., disk drive, solid-state memory device) and network interface 808 are also shown coupled to the I/O bus 805. The persistent data storage 806 may include mass/cold storage as described above, or mass/cold storage may be externally coupled via I/O bus 805.

One or more sensors 814 are coupled to the I/O bus 805 for processing by the system. In any of the embodiments described above, the main set of hardware (CPU 802, RAM 804, storage 806, network 808, GPU 809) or a subset thereof may be used to perform some or all of the processing actions such as DWT, machine learning, etc. In other embodiments, a set of computing nodes with specialized hardware may be used to perform some of these tasks. For example, the CPU 802 and RAM 804 may be configured to provide management functions (e.g., system management 418 as shown I FIG. 4) and one or more storage compute nodes 816 may be configured to perform streaming data computational functions, as indicated by machine learning and transform modules 826, 827. The storage compute device 816 may be configured to communicate via a standard storage interface 830, which includes a combination of hardware standards (e.g., SATA, Ethernet) and commands (e.g., SCSI).

The storage compute device 816 includes its own processor/controller 818 and RAM 820, as well as one or more types of internal data storage media 821 (e.g., hard disk, flash memory, etc.). The storage compute device 816 has a physical envelope and electrical interface of an industry standard storage drive (e.g., 3.5 inch or 2.5 inch form factor). The storage compute device 816 may be able to operate as a conventional drive, e.g., performing load and store from and to a set of logical block addresses mapped to the storage media 821. The storage compute device 816 may also have reserved areas of storage for use by the various modules 826, 827. For example, sensor data storage 822 may be used for storing reduced-size transforms of data, and features storage 824 may be used to store features detected by machine learning functions.

Generally, the apparatus 800 may govern functions of the system at a high-level, including the aforementioned management functions. The apparatus 800 may also store a configuration of a plurality of the storage compute devices 816, which includes a role of the device 816 (e.g., DWT, machine learning), definition of input and output streams, specification of what is kept in local storage 821, neural network structures, etc. In this way, the sensor stream processing of the system can be distributed over a large number of storage compute devices 816. The functions of the system can be updated by the apparatus 800 as needed (e.g., updated machine learning networks) or completely reconfigured to perform a different task.

Figure 9:
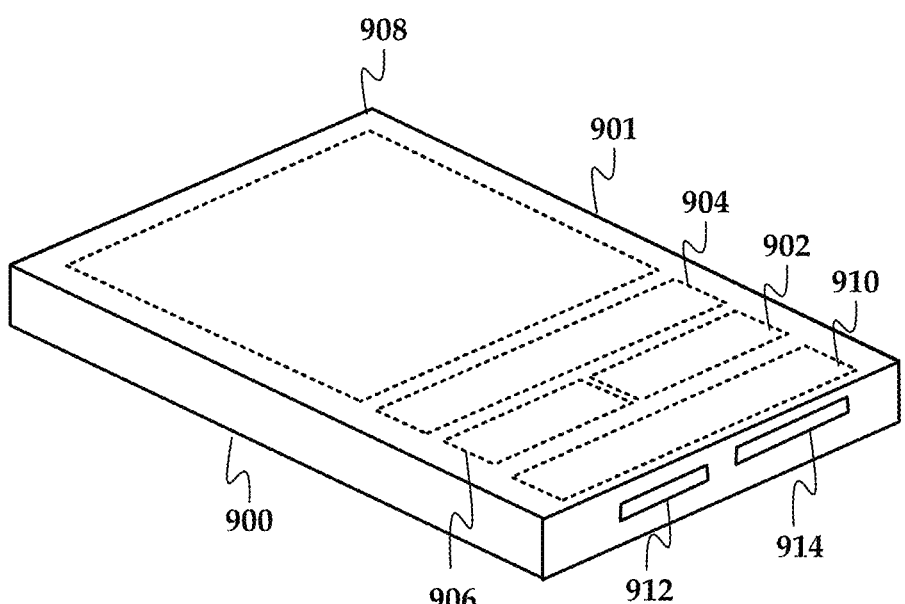
FIG. 9 is a perspective view of a storage compute device according to an example embodiment.

In FIG. 9, a block diagram shows a storage compute device 900 according to an example embodiment. The storage compute device 900 has an enclosure 901 that conforms to a standard hard drive physical interface, such as maximum dimensions, mounting hole location and type, connector location and type, etc. The storage compute device 900 may also include connectors 912, 914 that conform to standard drive physical and electrical interfaces for data and power. Note that while the standard drive interfaces were initially established for hard disks drives, a drive physical interface is also applicable to other persistent storage such as solid-state drives (SSD). Standards have been expanded to include interfaces storage devices (e.g., M.2 for SSD) that are not commonly used by hard disk drives.

A device controller 902 may function as a central processing unit for the storage compute device 900. The device controller 902 may be a system on a chip (SoC), in which case it may include other functionality in a single package together with the processor, e.g., memory controller, network interface 906, digital signal processing, etc. Volatile memory 904 is coupled to the device controller 902 and is configured to store data and instructions as known in the art. The network interface 906 includes circuitry, firmware, and software that allows communicating via a network, which may include a wide-area and/or local-area network.

The storage compute device 900 includes a storage medium 908 accessible via storage channel circuitry 910. The storage medium 908 may include non-volatile storage media such as magnetic disk, flash memory, resistive memory, etc. The device controller 902 in such a case can process legacy storage commands (e.g., read, write, verify) via a host interface 912 that operates via the network interface 906. The host interface may utilize standard storage protocols and/or standard network protocols via the data interface 912. The storage compute device 900 may also use a standard power interface 914, such as a 15-pin SATA power connector.

The storage compute device 900 includes a portion of volatile and/or non-volatile memory that stores computer instructions. These instructions may include various modules that allow the apparatus 900 to provide functionality for a sensor node as described herein. For example, the controller SoC 902 may include circuitry, firmware, and software modules that perform any combination of security, transformation, and machine learning as described for the sensor node 400 shown in FIG. 4. The controller SoC 902 may be able to parse and respond to commands related to these functions that are different than the legacy storage commands. For example, the controller SoC 902 may receive queries via the host interface 912 about where machine learning output data is stored so that it can be accessed by the host apparatus (e.g., apparatus 800 in FIG. 8).

Figure 10:
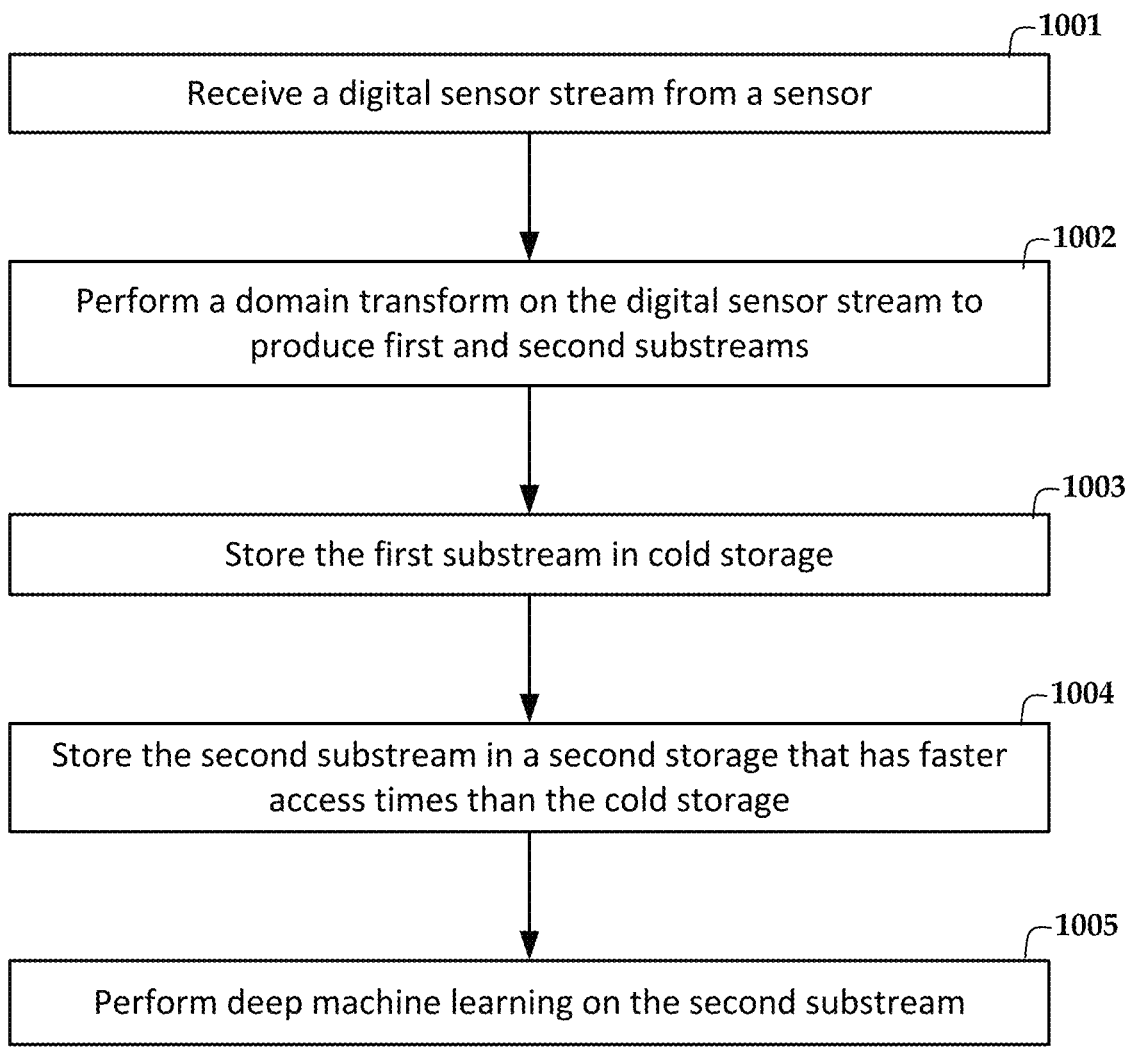
FIG. 10 is a flowchart of a method according to example embodiments.

In FIG. 10, a flowchart shows a method according to an example embodiment. The method involves receiving 1001 two or more digital sensor streams from two or more sensors. A domain transform is performed 1002 on each stream of the two or more digital sensor streams to provide first and second substreams. Each of the first and second substream has a size less than the respective stream, the first substreams being larger than the second substreams. The first substream is stored 1003 in cold storage and the second substream is stored 1004 in a second storage that has faster access times than the cold storage. Deep machine learning is performed 1005 on the second substream.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   receiving a digital sensor stream from a sensor;
   performing a domain transform on the digital sensor stream to produce first and second substreams, the first substream being larger than the second substream;
   storing the first substream in cold storage;
   storing the second substream in a second storage that has faster access times than the cold storage; and
   performing deep machine learning on the second substream, the results of the deep machine learning being stored in the second storage.

2. The method of claim 1, wherein the first and second substreams have respective first and second sizes that are less than a size of the digital sensor stream.

3. The method of claim 2, wherein the first size is (n−1)/n of the size of the digital sensor stream and the second size is 1/n the size of the digital sensor stream, wherein n≥4.

4. The method of claim 3, wherein n=16.

5. The method of claim 1, wherein the digital sensor streams comprise a video stream, and wherein the deep machine learning comprises at least one of face and body detection.

6. The method of claim 1, wherein the domain transform comprises a discrete wavelet transform.

7. The method of claim 1, wherein the deep machine learning comprises detecting features from the second substream at a first processing tier, the features being input to a second processing tier that detects anomalies from the features.

8. A system comprising:
   one or more input/output busses configured to receive a digital sensor stream from a sensor;
   a cold storage unit coupled to the input/output busses;
   a processor coupled to the input/output busses and configured to perform system management; and
   two or more storage compute devices coupled to the input/output busses and configured to:
      perform a domain transform on the digital sensor stream to produce first and second substreams, the first substream being larger than the second substream;
      store the first substream in the cold storage unit;
      store the second substream in a second storage that has faster access times than the cold storage unit; and
      perform deep machine learning on the second substream.

9. The system of claim 8, wherein the cold storage unit is optimized for sequential data access.

10. The system of claim 8, wherein the second storage unit is within at least one of the two or more storage compute devices, and wherein results of the deep machine learning are stored in the second storage.

11. The system of claim 8, wherein the first and second substreams have respective first and second sizes that are less than a size of the digital sensor stream.

12. The system of claim 11, wherein the first size is (n−1)/n of the size of the digital sensor stream and the second size is 1/n the size of the digital sensor stream, wherein n≥4.

13. The system of claim 12, wherein n=16.

14. The system of claim 8, wherein the digital sensor stream comprises a video stream, and wherein the deep machine learning comprises at least one of face and body detection.

15. The system of claim 8, wherein the domain transform comprises a discrete wavelet transform.

16. The system of claim 8, wherein the deep machine learning comprises detecting features from the second substream at a first processing tier, the features being input to a second processing tier that detects anomalies from the features.

17. A system comprising:
   one or more input/output busses configured to receive a digital sensor stream from a sensor;
   a domain transfer filter bank configured to perform a domain transform on the digital sensor stream to produce first and second substreams each having a respective size less than that of the digital sensor stream, the first substream being larger than the second substream; and
   one or more processing units coupled to the input/output busses and the domain transfer filter bank and configured to:
      store the first substream in a cold storage unit;
      store the second substream in a second storage that has faster access times than the cold storage unit; and
      perform deep machine learning on the second substream.

18. The system of claim 17, wherein the deep machine learning comprises detecting features from the second substream at a first processing tier, the features being input to a second processing tier that detects anomalies from the features.

19. The system of claim 18, wherein the digital sensor streams comprise a video stream, and wherein the features comprises at least one of detected faces and bodies.

20. The system of claim 17, wherein results of the deep machine learning are stored in the second storage.

* * * * *